United States Patent
Weng et al.

(10) Patent No.: US 7,696,638 B2
(45) Date of Patent: Apr. 13, 2010

(54) SYSTEMS AND METHODS FOR SUPPLYING VOLTAGE TO A CONTROL DEVICE

(75) Inventors: Karlheinz Weng, Munich (DE); Fathi Ei-Dwaik, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 137 days.

(21) Appl. No.: 11/642,861

(22) Filed: Dec. 21, 2006

(65) Prior Publication Data
US 2007/0145823 A1  Jun. 28, 2007

Related U.S. Application Data

(63) Continuation of application No. PCT/EP2005/003938, filed on Apr. 14, 2005.

(30) Foreign Application Priority Data
Jun. 25, 2004  (DE) ............ 10 2004 030 699

(51) Int. Cl.
*B60L 1/00* (2006.01)
*B60L 3/00* (2006.01)
*H02G 3/00* (2006.01)

(52) U.S. Cl. ..................................... 307/10.1
(58) Field of Classification Search ............. 307/10.1, 307/10.7
See application file for complete search history.

(56) References Cited
U.S. PATENT DOCUMENTS

| 5,497,322 | A | 3/1996 | Kolomyski et al. |
| 5,693,986 | A | 12/1997 | Vettraino, Jr. et al. |
| 5,796,175 | A * | 8/1998 | Itoh et al. ........... 307/10.1 |
| 6,384,489 | B1 * | 5/2002 | Bluemel et al. ...... 307/10.1 |
| 6,433,442 | B1 | 8/2002 | Maeckel et al. |
| 2003/0127912 | A1 * | 7/2003 | Mackel et al. ........ 307/10.1 |

FOREIGN PATENT DOCUMENTS

| DE | 40 40 405 C2 | 3/1993 |
| DE | 199 22 331 C1 | 11/2000 |
| DE | 199 52 112 A1 | 6/2001 |
| EP | 0 499 658 B1 | 8/1992 |

OTHER PUBLICATIONS

Form PCT/IB/338, Form PCT/IB/373, and Form PCT/ISA/237.
German Search Report dated Nov. 23, 2004 with English translation (Nine (9) Pages).
International Search Report dated Sep. 22, 2005 with English translation (Four (4) Pages).

* cited by examiner

*Primary Examiner*—Albert W Paladini
*Assistant Examiner*—Carlos Amaya
(74) *Attorney, Agent, or Firm*—Crowell & Moring LLP

(57) ABSTRACT

A voltage supply device for a control device that is mounted in a motor vehicle is provided. The control device comprises a logic unit, used mainly for processing information, and a power unit, used mainly for driving actuators. The logic unit is connected to a voltage source by means of a switchable supply line, and the power unit is connected to a voltage source by means of a non-switchable supply line.

17 Claims, 1 Drawing Sheet

SYSTEMS AND METHODS FOR SUPPLYING VOLTAGE TO A CONTROL DEVICE

CROSS REFERENCE TO RELATED APPLICATIONS

This application is a continuation of PCT International Application No. PCT/EP2005/003938, filed Apr. 14, 2005, which claims priority under 35 U.S.C. §119 to German Patent Application No. 10 2004 030 699.0, filed Jun. 25, 2004, the entire disclosures of which are herein expressly incorporated by reference.

BACKGROUND AND SUMMARY OF THE INVENTION

The present invention relates generally to electronic devices and, more particularly, to a voltage supply device of a control device that is mounted in a motor vehicle and that comprises a logic unit, used mainly for processing information, and a power unit, used mainly for driving the actuators.

Modern motor vehicles exhibit a large number of control devices, which under some circumstance continue to consume energy even while the motor vehicle is standing still. In particular, in the case of a malfunction of one or more control devices, this energy consumption may put an extremely high load on the vehicle battery of the motor vehicle, and with time the battery may be exhaustively discharged. Since the control devices are typically linked together by way of a databus, a fault in a single control device may also lead to an enhanced energy consumption of the other control devices.

The most common reasons for an exhaustive discharge of the battery of a motor vehicle include the following cases:

In a first case, due to a defect, a control device does not report its inactivity to the databus. All other control devices also remain active and, therefore, have an energy consumption that is higher than in the off state. In this way, the vehicle battery may be loaded with a steady current of several amperes (e.g., 5 A).

In another case, due to a defect, a control device repeatedly sends wake-up signals to all of the other control devices, connected to the databus. These control devices thus change repeatedly into an active state and have an energy consumption that is higher than in the off state. Even such defects may result in current being drawn from the vehicle battery. This current may be in the ampere range (e.g., 1 A) in the time average.

In another case, due to a defect, the processor of a control device performs enhanced computational services without simultaneously influencing other control devices. In this case, the resulting additional current drain from the vehicle battery may be in the range of several hundred milli-amperes (e.g., 200 mA).

A variety of devices exist by which an exhaustive discharge is avoided by separating the individual consumers, all consumers or groups of consumers from their voltage supply. The separation is typically carried out by opening a switch unit (e.g., a monostable or bistable relay), which is provided in the supply line of one or more control devices. The separation may be effected in a time-controlled manner, an event-controlled manner or—as known, for example, from the DE 19922331 C1—upon the request of a user.

In the design of the majority of the control devices currently installed in motor vehicles, one can distinguish between a logic part, used mainly for processing information, and a power part, used mainly to drive the actuators. In conventional systems, both parts are supplied with voltage from a common supply line. When the switch unit is closed and the control devices are operating, the sum of the useful currents of all of the control devices, which are supplied by this supply line, flows over such a supply line. Thus, the switch unit is designed in such a manner that it can be loaded with the maximum value of the sum of useful currents, flowing over the respective supply line.

Specific functionalities of modern motor vehicles (e.g., activation) require useful currents of up to 40 A just for a single control device. A corresponding design of the switch units may be technically feasible, but is associated with high production costs. Therefore, a drawback of conventional systems lies in the fact that the switching off in the sense of preventing the current from being drawn from a voltage source by a control device having a high useful current requirement by opening a switch unit is realizable only at a very high cost.

An aspect of the invention is to provide an inexpensive device, which may be achieved with a low complexity in design and which prevents in an efficient way the current from being drained from a voltage source by a defective control device.

Consistent with the present invention, separate supply lines are provided for the voltage supply of the part (logic unit) used mainly for processing information and for the part (power unit) used mainly to drive the actuators of a control device, and only the supply line of the logic unit is provided with a switch unit.

One advantage of the invention lies in the fact that the switch unit, provided in the supply line of the logic unit, is designed for a load of significantly lower current intensities and thus may be realized at a considerably lower cost.

The cause of the majority of the faults occurring in control devices and relevant to an exhaustive discharge of the vehicle battery lies in a defective processing of information. The fault cases described above document this situation. To prevent in an efficient way the current drain by a defective control device, it is sufficient to separate its logic unit from the voltage supply. Hence, the control device is put into a state, in which the power unit is, in fact, supplied with voltage, but does not draw any current.

The circuit-relevant division into a logic unit and a power unit is already executed in the majority of the control devices used today, or may be achieved with a low complexity in design. The interconnection may be carried out in such a manner that the power unit may draw current only if the power unit is also supplied with voltage. The design, production and material costs for the variant with separate supply lines, instead of a common supply line, are ignorable, compared to the savings that can be achieved by the modified load on the switch unit, especially in motor vehicles with a plurality of installed control devices.

Other objects, advantages and novel features of the present invention will become apparent from the following detailed description of the invention when considered in conjunction with the accompanying drawings.

BRIEF DESCRIPTION OF THE DRAWING

The invention is explained in detail below with reference to the attached drawing. In the single drawing.

DETAILED DESCRIPTION OF THE DRAWING

Figure 1:
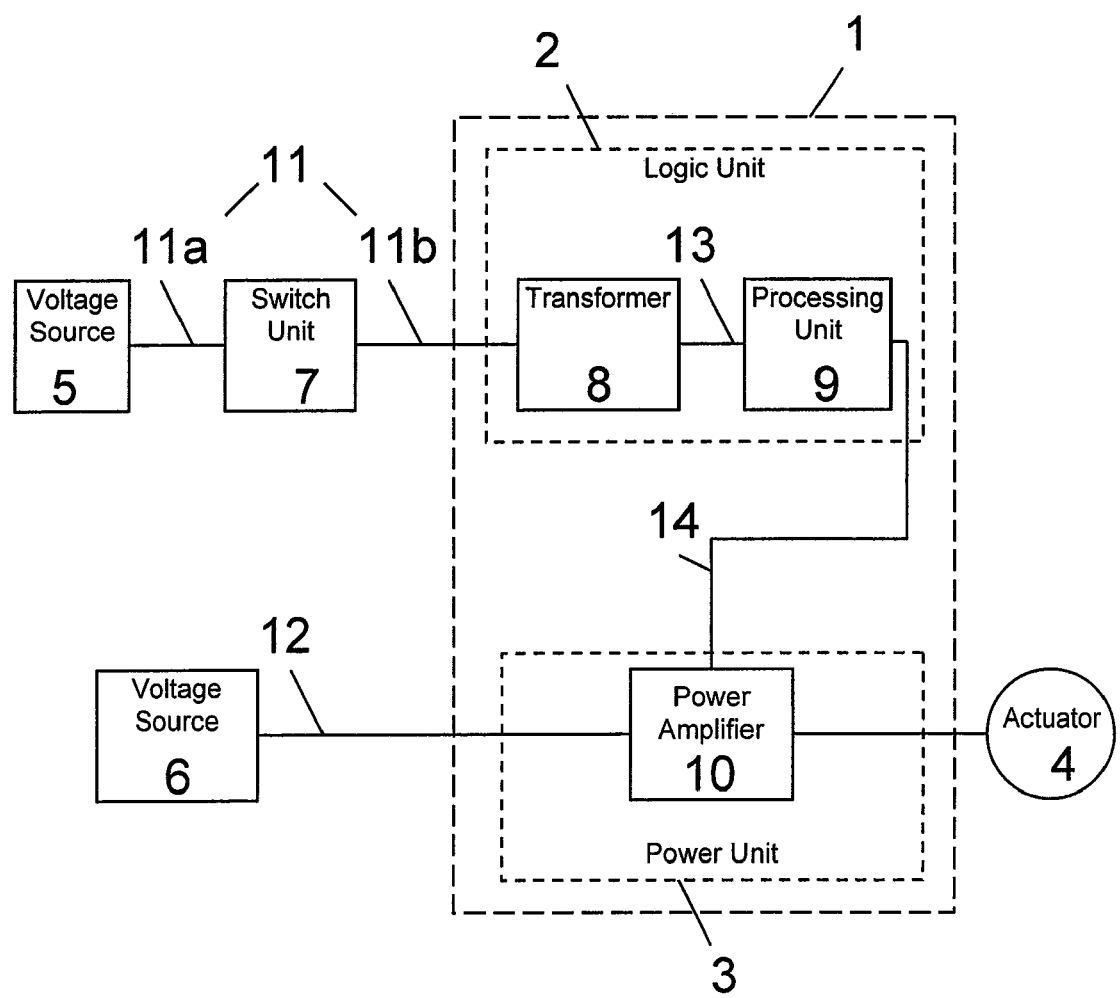
FIG. 1 is a block diagram of separate voltage supply of the logic unit and the power unit of a control device in a motor vehicle, consistent with the present invention.

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

The block diagram in FIG. 1 depicts, as a schematic drawing, the inventive connection to the separate voltage supply of the logic unit and of the power unit of a control device in a motor vehicle. The control device 1 comprises a logic unit 2, used mainly for processing information, and a power unit 3, used mainly to drive the actuators 4.

The logic unit 2 is connected to a voltage source 5, preferably the vehicle battery, by means of a supply line 11. In the supply line 11, there is a switch unit 7 between the two line segments 11a and 11b. The switch unit 7 is suitable for separating the logic unit from the voltage supply. For purposes of explanation, the block diagram in FIG. 1 shows just one line, instead of a power line and a ground line. The switch unit may be provided, consistent with the present invention, both in the ground line and in the power line of the voltage supply of the logic unit 2.

Inside the logic unit 2, a transformer 8 typically transforms the supply voltage to the operating voltage of the information processing unit 9 and applies this voltage to the information processing unit 9 via the line 13. From the information processing unit 9, a voltage signal is sent to the power unit 3 by way of the line 14. The current drawn by the logic unit from the voltage source 5 over the line 11 matches in essence the current consumption of the transformer 8 and the information processing unit 9. The current flowing over the closed switch unit 7 exhibits a correspondingly low current intensity.

The power unit 3 is connected to a voltage source 6 by means of the supply line 12. The voltage source 6 may be identical to the voltage source 5. The power unit typically contains a power amplifier 10. If a corresponding voltage signal is applied to the input line 14 of the power amplifier, current flows to the actuator 4 via the line 15. Therefore, the current is drawn essentially from the voltage source 6 over the line 12.

If the supply line 11 is split by opening the switch unit 7, the logic unit 2 is no longer supplied with voltage. In this state, a defined voltage signal (typically permanently 0 V) is applied to the output line 14 of the information processing unit 9. The power amplifier 10 is designed in such a manner that upon applying this defined voltage signal, the actuator 4 cannot draw current over the supply line 12.

When the switch unit 7 is open, neither the logic unit 2 nor the power unit 3 draws current from a voltage source. The switch unit 7 therefore needs to be designed only for the maximum useful current of the logic unit 2. This feature results in a significant cost advantage over conventional systems.

Various known mechanical or electronic switches may be considered for the device-relevant design of the switch unit 7. In one implementation of the present invention, a bistable relay is used as the switch unit 7. Bistable relays exhibit the advantage that they do not require a holding current for maintaining the current switching position, thus they are self-holding.

For purposes of explanation, in the described embodiment of the invention, only one single part of the device, the logic unit in this case, of a single control device is supplied with voltage over a supply line, which can be interrupted by a switch unit. However, consistent with the present invention, in an arbitrary number of control devices an arbitrary number of subunits, which can be supplied with voltage separately from the rest of the control device, can be separated from their voltage supply by means of a common switch unit 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A voltage supply device of a control device, the control device mounted in a motor vehicle and comprising a logic unit for processing information and a power unit for driving actuators,
   wherein the logic unit comprises:
      a processing unit;
      a transformer for transforming the voltage from the first voltage source to an operating voltage of the processing unit; and
      a supply line coupled between the transformer and the processing unit for providing the operating voltage to the processing unit;
   wherein a voltage signal is provided from the processing unit to the power unit via an output line;
   wherein the power unit comprises a power amplifier, and wherein current flows to the actuators when the power amplifier receives the voltage signal provided from the processing unit via the output line;
   wherein the logic unit is connected to a first voltage source via a switch, and
   wherein the power unit is connected to a second voltage source by means of a non-switchable supply line.

2. The voltage supply device of claim 1, wherein the switch is switched by a self-holding relay.

3. A voltage supply system for a control device mounted in a motor vehicle, the control device comprising a logic unit for processing information and a power unit for driving actuators, the voltage supply system comprising:
   a switchable supply line for providing to the logic unit a voltage from a first voltage source, wherein the switchable supply line comprises a switch for separating the logic unit from the first voltage source; and
   a non-switchable supply line for providing to the power unit a voltage from a second voltage source
   wherein the logic unit comprises:
      a processing unit;
      a transformer for transforming the voltage from the first voltage source to an operating voltage of the processing unit; and
      a supply line coupled between the transformer and the processing unit for providing the operating voltage to the processing unit;
   wherein a voltage signal is provided from the processing unit to the power unit via an output line;
   wherein the power unit comprises a power amplifier, and wherein current flows to the actuators when the power amplifier receives the voltage signal provided from the processing unit via the output line.

4. The system of claim 3, wherein the first voltage source is a vehicle battery in the motor vehicle.

5. The system of claim 4, wherein the first voltage source and the second voltage source are the same voltage source.

6. The system of claim 3, wherein the switch is provided in at least one of a ground line of the supply line and a power line of the supply line.

7. The system of claim 6, wherein the switch is configured such that, when the switch separates the logic unit from the first voltage source, neither the logic unit nor the power unit is operable to draw current.

8. The system of claim 3, wherein current flows to the actuators when the power unit receives the voltage signal provided from the processing unit via the output line.

9. The system of claim 3, wherein the current is drawn substantially from the second voltage source via the non-switchable supply line.

10. The system of claim 3, wherein a defined voltage signal is applied to the output line when the switch separates the logic unit from the first voltage source.

11. The system of claim 10, wherein the defined voltage signal is 0 volts.

12. The system of claim 10, wherein the power amplifier is configured such that, when the defined voltage signal is applied to the output line, the actuators are inoperable to draw current over the non-switchable supply line.

13. The system of claim 3, wherein the control device comprises an additional unit that is provided with a voltage separately from the logic unit and the power unit.

14. A method for supply voltage to a control device mounted in motor vehicle, the control device comprising a logic unit for processing information and a power unit for driving actuators, the method comprising the acts of:
    providing to the logic unit a voltage from a first voltage source via a switch, wherein the logic unit comprises:
        a processing unit;
        a transformer for transforming the voltage from the first voltage source to an operating voltage of the processing unit; and
        a supply line coupled between the transformer and the processing unit for providing the operating voltage to the processing unit;
    providing a voltage signal from the processing unit to the power unit via an output line, wherein the power unit includes a power amplifier, and wherein current flows to the actuators when the power amplifier receives the voltage signal provided from the processing unit via the output line;
    providing to the power unit a voltage from a second voltage source via a non-switchable supply line; and
    preventing the logic unit and the power unit from drawing current from the first and second voltage sources, when the logic unit is separated from the first voltage source.

15. The method of claim 14, further comprising:
    transforming the voltage from the first voltage source to an operating voltage of a processing unit coupled to the logic unit; and
    providing the operating voltage to the processing unit.

16. The method of claim 15, further comprising:
    providing a voltage signal from the processing unit to the power unit; and
    allowing current to flow to the actuators when the power unit receives the voltage signal from the processing unit.

17. The method of claim 14, further comprising:
    generating a defined output voltage when the logic unit is separated from the first voltage source; and
    preventing the actuators from drawing current over the non-switchable supply line in response to the defined output voltage.

* * * * *